United States Patent [19]

Kessler

[11] 4,113,905

[45] Sep. 12, 1978

[54] D.I.G. FOAM SPACER

[76] Inventor: Gerald Kessler, Box 398, Youngstown, Ohio 44501

[21] Appl. No.: 757,291

[22] Filed: Jan. 6, 1977

[51] Int. Cl.[2] ............................ E06B 3/24; B32B 5/18

[52] U.S. Cl. ......................................... 428/34; 52/399; 428/213; 428/313; 428/315; 428/425; 156/109; 52/790

[58] Field of Search .................. 428/34, 425, 315, 213, 428/313; 156/109; 52/399, 616; 264/DIG. 83, 45.9, 46.1, 46.7

[56] References Cited

U.S. PATENT DOCUMENTS

| | | | |
|---|---|---|---|
| 2,992,939 | 7/1961 | Larson | 428/425 |
| 3,439,075 | 4/1969 | Bauer | 264/46.7 |
| 3,443,984 | 5/1969 | Stewart | 264/45.9 |
| 3,528,458 | 9/1970 | Gaekel | 264/45.9 |
| 3,730,660 | 5/1973 | Raffenberg | 425/301 |
| 3,775,914 | 12/1973 | Patil | 52/399 |
| 3,840,626 | 10/1974 | Laskawy | 264/46.4 |
| 3,855,028 | 12/1974 | Larson | 428/213 |
| 3,872,198 | 3/1975 | Britton | 428/34 |
| 3,991,146 | 11/1976 | Barrie | 428/313 |

*Primary Examiner*—Ellis Robinson
*Attorney, Agent, or Firm*—Browdy and Neimark

[57] ABSTRACT

A composite foam spacer for precision separation of the plates in double insulated glass comprises a thin extruded core and a relatively thick foam layer cast to the core so that the resulting coefficient of expansion of the composite is equal to that of the foam layer and approximately equal to that of glass. The cast foam spacer has good thermal insulating properties, reducing heat transfer between the glass panes, and reducing the differential dimensional change between the glass and the spacer, resulting in a structurally stronger sealed unit.

3 Claims, 4 Drawing Figures

D.I.G. FOAM SPACER

FIELD OF THE INVENTION

The present invention relates to improving thermal insulation between spaced panels, and, more particularly, to cast foam spacers for double insulated glass having a coefficient of expansion close to glass.

DESCRIPTION OF THE PRIOR ART

A critical consideration in modern building construction, due to the shortage and high cost of energy, is energy conservation. A particular problem is the loss of heat from a building through the extensive glass surfaces that are used in modern architecture. One solution has been the increased use of insulating glass units comprising basically two glass panels separated by sealed dry air space. Sealed insulating glass units generally require some means of precisely separating the two panels. The spacers commonly used are generally tubular channels of aluminum or some other metal containing a desiccant to keep the sealed air space dry.

There are certain significant factors which affect the suitability of the spacer, particularly the heat conducting properties of the material and the coefficient of expansion. Since a metal spacer is a much better heat conductor than the surrounding air space, its use leads to the conduction of heat between the inside glass plate and the outside glass plate resulting in heat dissipation and energy loss. Further, the coefficient of expansion of commonly used spacer materials is much higher than that of glass. Thus heat conduction results in a differential dimensional change between the glass and the spacer thereby causing stresses to develop on the glass and in the seal which can result in damage to and the failure of the sealed glass unit, such as by sufficient lengthwise shrinkage of the spacer to cause it to pull away from the sealant.

There has been some experimentation with the use of plastic spacers rather than metal, particularly polyvinyl chloride or other extruded plastic spacers, but these have coefficients of expansion much greater than glass and so have led to units that are structurally weak. Furthermore, most thermoplastics have been unacceptable for use as spacers because they give off voltile materials which cloud or fog the interior glass surface.

In other fields the prior art does show some examples of the production of hollow plastic objects by casting techniques. Thus the U.S. Pat. No. 3,840,626 to Laskawy et al. shows a method of suspending a casting core of foam thermoplastic plastomer within a mold cavity by means of wires imbedded within the core and attached to the walls of the mold. A hard foam reaction mixture is then sprayed into the mold cavity and autogenously creates a temperature high enough to melt the core which precipitates along the wall of the hard foam of the hollow structure thus formed. U.S. Pat. No. 3,510,551 to McCrea describes a method of casting composite articles. Part of the casting mold is a thermoplastic material which plasticizes when a fluid plastic material is placed in the mold and becomes integrally bonded with the hardening fluid plastic.

Kasch U.S. Pat. No. 1,811,086 shows a hollow core element of metallic material of approximately the same shape as the final product but slightly smaller which is secured in a mold of also substantially the same shape but larger. A phenolic condensation product placed between the core and mold is cured and forms together with the metallic core the finished product. The Gits et al. U.S. Pat. No. 2,285,963 describes a two mold process where the first mold is used to form a core element which is then placed in a second mold substantially the shape of the finished product in which a second thin layer of plastic is molded to the core element.

U.S. Pat. No. 3,730,660 to Raffenberg discloses the production of tubular bodies of polyurethane foam material covered both internally and externally with a web or foil. A core wrapped with a foil material is suspended in a mold lined with the foil material. The foam is injected into the annular space defined between the core and the mold where it hardens to solidified foam.

None of these prior patents is concerned with the particular problems of double insulated glass and none provides a solution to these problems.

SUMMARY OF THE INVENTION

It is accordingly an object of the present invention to overcome the deficiencies of the prior art such as indicated above.

It is another object of the present invention to improve thermal insulation, particularly in buildings.

It is yet another object of the present invention to provide for improved double insulated glass.

It is a further object to reduce heat transfer from one pane of glass to the other through the spacer element of double insulated glass.

It is another object of the invention to provide a spacer with a coefficient of expansion approximately equal to that of glass.

The present invention relates to an improved plastic spacer with a coefficient of expansion close to that of glass and a method of manufacturing such a spacer in a long hollow shape for use in double insulated glass. The spacer is cast using a foam-in-place phenolic or polyurethane resin with the result that the coefficient of expansion is nearly the same as glass. The method involves first extruding or roll forming a hollow thin walled shape of plastic or metal of under 10 mils wall thickness which is then used as a core for the foam casting. The core is suitably spaced within the mold and the thermosetting foam is cast within the mold and above the core and thus the hollow core becomes a part of the finished product.

When a very thin walled core is attached firmly to a thick walled material with substantially greater strength, the expansion and contraction of the thin walled core will follow the stronger member. Thus, in the cast spacer the thin core will follow the expansion-contraction characteristics of the cast foam which has a coefficient of expansion nearly equal to that of glass.

An injection molding press may be suitably used to hold a casting mold for several long pieces. The hollow core may be supported in the elongated casting mold by rods while a liquid curable and foamable resin is being introduced into the mold and during the curing process. The rods are removed at the time the finished spacer is removed from the mold.

BRIEF DESCRIPTION OF THE DRAWINGS

The invention and its further objects and advantages will be better understood by the following detailed description of various embodiments cited for the sake of illustration with reference to the accompanying drawings in which.

DETAILED DESCRIPTION OF THE EMBODIMENTS

The preferred embodiment of the present invention is a cast foam spacer which includes a very thin core of extruded plastic or metal. The core is left in the spacer because it is difficult to remove and there is no particular advantage in removing it. However, if the foam layer is not tightly bonded to the core, the core may be removed leaving only the cured foam. The insulating properties of the foam material and the minimum contact made with the glass by the spacer through narrow projecting contact edges make the spacer a good insulator, reducing heat flow between the panes of glass. A relatively thick foam layer with a very thin extruded core takes on the expansion and contraction properties of the thicker foam layer giving the spacer a coefficient of expansion very close to that of glass. The spacer permits conventional bonding of the double insulated glass unit but because the spacer has a coefficient of expansion about equal to glass, the bonding will be structurally more reliable. Because the spacer is made chiefly from cured foam material such as a phenolic or polyurethane resin rather than more expensive metal, such spacer is relatively cheap compared to conventional metal spacers beside being more effective.

Figure 1:
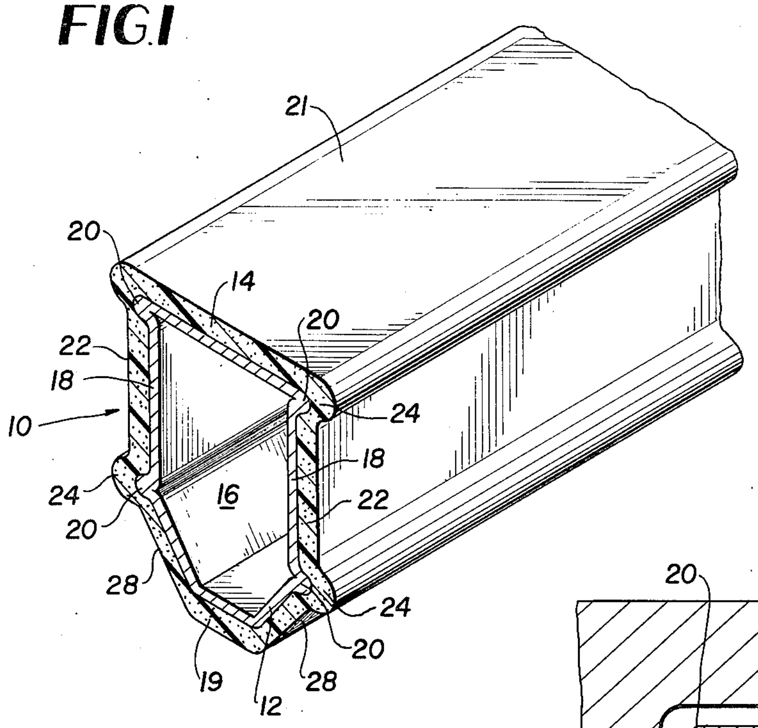
FIG. 1 is a cross-sectional perspective view of an embodiment of a cast foam spacer with a thin plastic or metal core, in accordance with the present invention.

The foam spacer 10 as shown in FIG. 1 comprises a thin extruded core 12 of, for example about 10 mils thickness, and a relatively much thicker, e.g. about 25–150 mils thickness, cured foam plastic layer 14 cast onto and about the thin core 12. The thin core 12, which is preferably extruded or roll-formed of metal such as aluminum or plastic such as PVC, defines a hollow channel 16 with lateral side walls 18 with projecting edges 20. The cast foam layer 14 has lateral side walls 22 with projecting contact edges 24, and sloping walls 28, as well as another wall 19 which forms part of the edge of the sealed glass unit, and an inside wall 21 which faces the space between the glass plates in the sealed unit.

Figure 3:
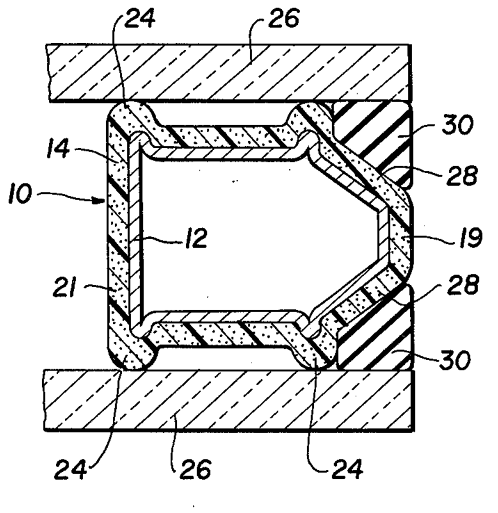
FIG. 3 is a cross-sectional view of the details of construction of a sealed glass unit with the spacer of FIG. 1.

The construction of a sealed glass unit using the foam spacer in FIG. 1 is shown in FIG. 3 where a pair of glass plates 26 are separated by the insulating spacer 10. The space between the sloping walls 28 of the spacer and the glass panes 26 are filled with a suitable sealant 30 to bond the unit together. The contact edges 24 make only minimal contact with the glass and thus increase the already good insulating properties of the foam spacer.

Figure 4:
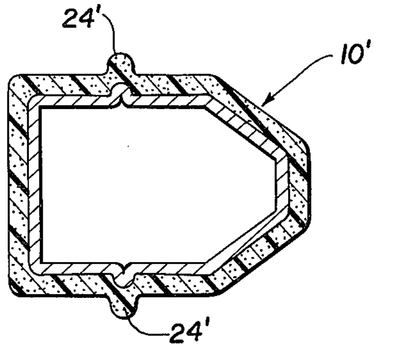
FIG. 4 is a cross-sectional view similar to FIG. 1 of another embodiment of a cast foam spacer in accordance with the present invention.

An alternate embodiment of a foam spacer 10' is shown in FIG. 4. Here there is only one contact edge 24' on each side of the spacer 10' further minimizing the contact of the spacer with the glass.

Figure 2:
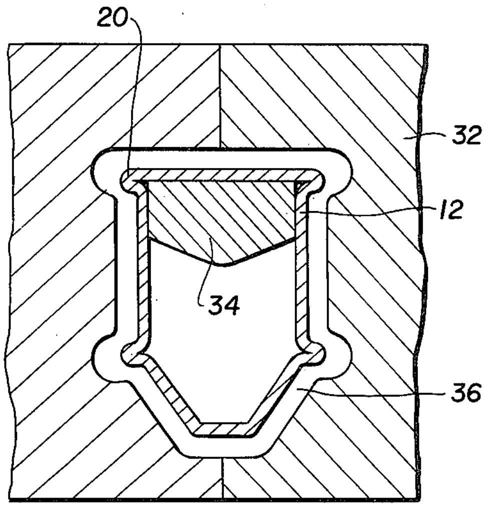
FIG. 2 is a cross-sectional view of a thin core supported in a mold by a support rod before the foam casting process takes place.

The process of making the foam spacer is illustrated in FIG. 2. The thin extruded or roll-formed core 12 is supported in an elongated two-piece casting mold 32, for example 8 feet in length, by means of a support rod 34. Curable foam plastic is cast or fed into the annular space 36 formed between the core 12 and the mold 32. The foam is then cured and allowed to cool so that it shrinks around the hollow core forming a relatively thick layer around the core. On the other hand, conventional injection molding techniques are impractical to make a hollow elongated, e.g. 8 feet long, body having a wall thickness on the order of 60 mils or less.

The core is very thin, preferably under 10 mils in thickness. It is made of an extruded or roll formed material, either a metal such as aluminum or steel or some type of extrudable plastic such as PVC or phenylene oxide polymer. The foam material used in the casting is a foam-in-place phenolic, polyester or polyurethane resin. A hollow foam plastic spacer is thus produced the foam layer of which is about 25–150 mils, preferably 30 mils, wall thickness and of relatively long length, approximately 8 feet. Several such spacers may be cast at once, and approximately 20 such pieces can be made at one time in an injection molding press carrying such casting molds.

The advantages of the cast foam spacer are the reduced heat transfer characteristics from the use of a material which has very poor heat conduction properties and the structural rigidity from the use of a material with a coefficient of expansion approximately equal to that of glass so that stresses from differential temperature changes are minimized. The curable foam plastics mentioned are preferred because they have such properties which provide not only reduced stresses in the sealed unit, but also better insulation and good adherence of the sealant. Thermoplastics, on the other hand, normally give off volatile components which cause fogging of the interior glass surface, and furthermore the thermoplastics have coefficients of expansion which are quite high. The technique by which the present spacer is made is simple, effective and relatively inexpensive. The overall width of the sealed glass unit can be adjusted by varying the thickness of the cast foam layer so that only one standard size of the thin extruded core need be used.

Of course, other embodiments and adaptations may be provided without going beyond the scope of the invention. For example, other spacer shapes may be provided, such as that shown in FIG. 4 of my copending application Ser. No. 733,902, now U.S. Pat. No. 4,057,945, hereby incorporated by reference. It will be obvious to those skilled in the art that various changes may be made without departing from the scope of the invention and the invention is not to be considered limited to what is described in the specification.

What is claimed is:

1. In double insulated glass comprising a pair of separated glass panes, an air space therebetween, an elongated spacer between said glass panes about their periphery, and a plastomeric or elastomeric sealant bonding said spacer to said glass panes and sealing the air space therebetween, the improvement wherein:

said spacer is a hollow cast thermoset foam spacer, comprising a thick foam layer of thickness less than 150 mils cast about a very thin extruded hollow core of thickness no greater than about 10 mils, the coefficient of expansion of said spacer being approximately equal to that of glass, to reduce the stress from differential dimensional change between the glass and said spacer, and to reduce heat transfer between said glass panes through said spacer; said spacer having at least one projecting contact edge, running along the length of said spacer, located on each of the two sides of said spacer which contact the glass panes.

2. A product as claimed in claim 1 wherein said core is formed of extruded or roll-formed metal or plastic.

3. A product as claimed in claim 1 wherein said foam layer has a thickness of about 30 mils.

* * * * *